United States Patent
Medwed et al.

(10) Patent No.: US 11,272,363 B2
(45) Date of Patent: Mar. 8, 2022

(54) AUTHENTICATION METHOD IN A COMMUNICATION SYSTEM

(71) Applicant: NXP B.V., Eindhoven (NL)

(72) Inventors: Marcel Medwed, Graz (AT); Pim Vullers, Reuver (NL); Joost Roland Renes, Eindhoven (NL); Stefan Lemsitzer, Stainz (AT)

(73) Assignee: NXP B.V., Eindhoven (NL)

( * ) Notice: Subject to any disclaimer, the term of this patent is extended or adjusted under 35 U.S.C. 154(b) by 121 days.

(21) Appl. No.: 16/829,401

(22) Filed: Mar. 25, 2020

(65) Prior Publication Data
US 2021/0306852 A1    Sep. 30, 2021

(51) Int. Cl.
| H04L 29/06 | (2006.01) |
| H04L 9/32 | (2006.01) |
| H04W 12/06 | (2021.01) |
| H04W 12/037 | (2021.01) |

(52) U.S. Cl.
CPC .......... *H04W 12/06* (2013.01); *H04L 9/3221* (2013.01); *H04L 9/3265* (2013.01); *H04W 12/037* (2021.01)

(58) Field of Classification Search
CPC .. H04W 12/06; H04W 12/037; H04L 9/3221; H04L 9/3265
See application file for complete search history.

(56) References Cited

U.S. PATENT DOCUMENTS

| 8,132,005 B2 | 3/2012 | Tarkkala et al. |
| 8,281,149 B2 | 10/2012 | Laurie et al. |
| 8,799,656 B2 | 8/2014 | Brickell et al. |
| 10,063,374 B2 * | 8/2018 | Bamasag ................ H04L 9/085 |
| 2003/0065692 A1 * | 4/2003 | Furukawa ............. H04L 9/0643 708/277 |

(Continued)

FOREIGN PATENT DOCUMENTS

CN        105871869 A     8/2016

OTHER PUBLICATIONS

Camenisch, Jan et al.; "A Signature Scheme with Efficient Protocols;" Security in Communication Networks, Third International Conference, SCN 2002; Amalfi, Italy; Sep. 11-13, 2002; DOI:10.1007/3-540-36413-7_20.

(Continued)

*Primary Examiner* — Gary S Gracia
(74) *Attorney, Agent, or Firm* — Daniel D. Hill

(57) ABSTRACT

A method is provided for authenticating one device to another device. In the method, a first device proves to a second device that a first credential comprising multiple first attributes is valid. The second device proves to the first device that a second credential comprising multiple second attributes is valid. The first device reveals a first attribute of the multiple first attributes to the second device. The second device verifies the first attribute and decides whether to continue revealing attributes. If continuing, the second device reveals to the first device a first attribute of the multiple second attributes. The first device verifies the first attribute of the multiple second attributes. The first device decides whether to continue revealing attributes. Attributes can be revealed until one of the first or second devices end the method or until no attributes of the multiple first and second attributes remain to be revealed.

17 Claims, 3 Drawing Sheets

(56) References Cited

U.S. PATENT DOCUMENTS

| | | | | |
|---|---|---|---|---|
| 2010/0115281 | A1* | 5/2010 | Camenisch | H04L 9/302 |
| | | | | 713/175 |
| 2012/0023334 | A1* | 1/2012 | Brickell | H04L 9/0844 |
| | | | | 713/169 |
| 2012/0284518 | A1 | 11/2012 | Walker et al. | |
| 2014/0082361 | A1* | 3/2014 | Camenisch | H04L 9/0847 |
| | | | | 713/168 |
| 2014/0223526 | A1* | 8/2014 | Lu | H04L 63/0407 |
| | | | | 726/6 |
| 2015/0244525 | A1* | 8/2015 | McCusker | H04L 9/3218 |
| | | | | 380/44 |
| 2017/0034142 | A1* | 2/2017 | Camenisch | H04L 63/08 |
| 2017/0163421 | A1* | 6/2017 | Chase | G09C 1/00 |
| 2018/0097614 | A1* | 4/2018 | Sherman | H04L 9/3218 |
| 2018/0302224 | A1* | 10/2018 | Wilson | H04W 12/033 |
| 2019/0013937 | A1 | 1/2019 | Leong et al. | |
| 2019/0268146 | A1* | 8/2019 | Samid | H04L 9/3226 |
| 2020/0126075 | A1* | 4/2020 | Fisch | G06F 21/44 |
| 2020/0313897 | A1* | 10/2020 | Heath | G06Q 20/405 |

OTHER PUBLICATIONS

Camenisch, Jan et al. Security Team, Computer Science Dept. IBM Research Report; "Specification of the Identity Mixer Cryptographic Library;" Version 2.3.0, IBM Research—Zurich; Revised Version: Apr. 29, 2010.

Diffie, Whitfield et al.; "Authentication and Authenticated Key Exchanges;" Published: Designs, Codes and Cryptography, vol. 2, Issue 2; Jun. 1, 1992; https://doi.org/10.1007/BF00124891.

Eltayieb, Nabeil et al.; "ASDS: Attribute-Based Secure Data Sharing Scheme for Reliable Cloud Environment;" Security and Privacy Journal-Article; Published on Jan. 22, 2019; https://doi.org/10.1002/spy2.57.

Huang, Dijiang et al.; "Gradual Identity Exposure Using Attribute-Based Encryption;" 2nd IEEE International Conference on Social Computing, SocialCom2010, 2nd IEEE International Conference on Privacy, Security, Risk and Trust, PASSAT 2010; Aug. 20-22, 2010; Minneapolis, MN.

Paquin, Christian et al.; "U-Prove Cryptographic Specification V1.1, Revision 3;" Microsoft Corporation; Dec. 2013.

* cited by examiner

AUTHENTICATION METHOD IN A COMMUNICATION SYSTEM

BACKGROUND

Field

This disclosure relates generally to authentication, and more particularly to an authentication method in a communication system.

Related Art

In a localized vicinity-based wireless communication system, such as UWB, communication between entities without knowing the identity of the other entities is common. The communication may be for the exchange of information or some other type of transaction. However, there is the risk that one of the entities may be a malicious entity with the goal of scanning the other entities to collect information and invade privacy. Also, even if an entity is willing to share its identity with another entity based on perceived trustworthiness of the other entity, the sharing entity still does not want to share its identity with all the other entities in the vicinity at the same time.

In another scenario, in a communication between two parties, neither party may be willing to initially share their identity with the other party. However, it is difficult to keep the privacy of both parties protected in a mutual authentication scenario.

Therefore, a need exists for an authentication method that solves at least some of the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
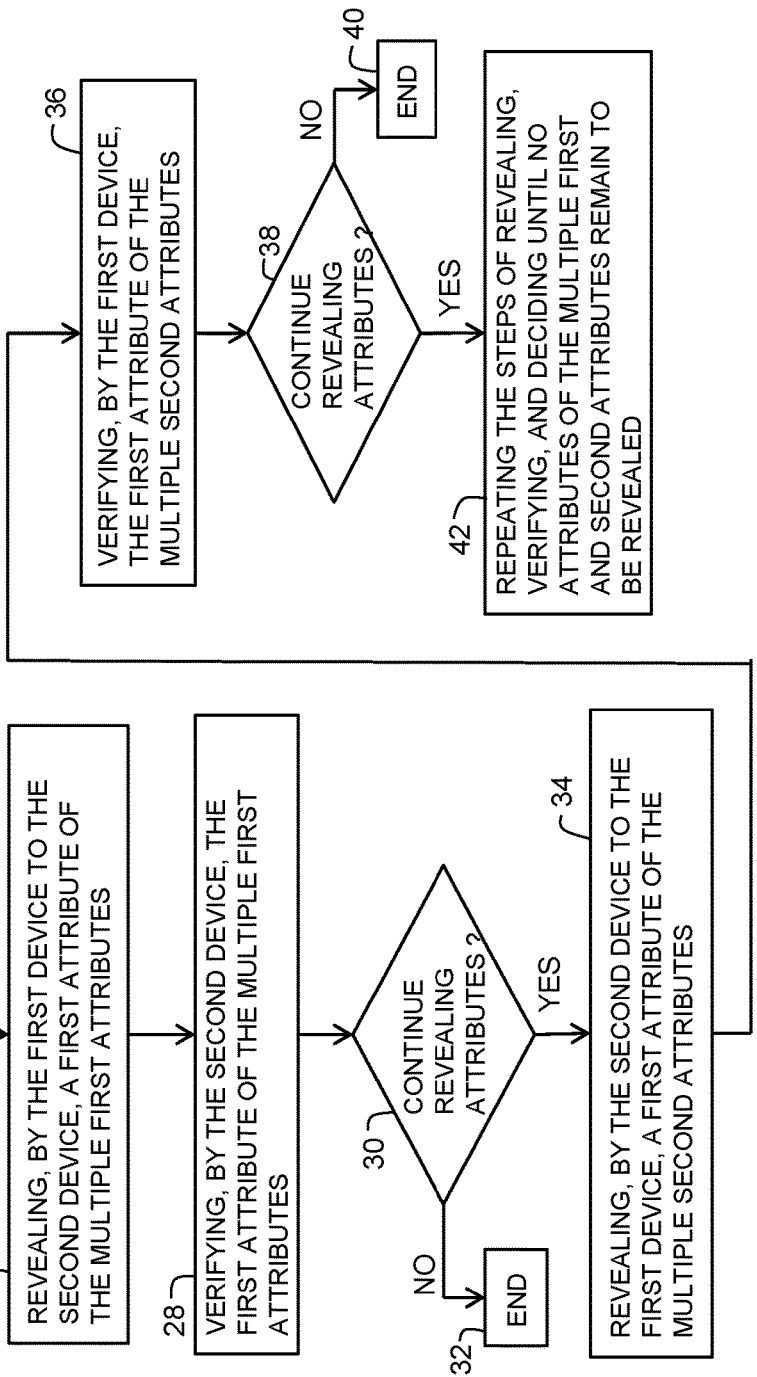
FIG. 1 illustrates a flowchart of a method for authenticating in accordance with an embodiment.

Generally, in a station-to-station (STS) communication according to the described embodiments, a signature scheme together with a certificate chain is used to build up a secure channel where two parties, or devices of the parties, own signed multiple-show attribute-base credentials. The attributes in the credentials serve as a hierarchical identity (e.g., first name, last name, country, identification number, etc.). Throughout the protocol, the devices first prove to each other that the credentials are valid and that the devices know all the attributes in the credentials. In a first step, a session is established, and both devices remain fully anonymous. Furthermore, because the credentials are multiple-show credentials, several protocol runs using the same credentials cannot be linked. In a second step, the devices gradually reveal their attributes in turns. Each device decides after verifying each received attribute whether the device wants to continue with the protocol. If a device reveals its entire identity, the device is again trackable. However, a device can also stop before revealing all its attributes. For example, a device can stop participation in the protocol after revealing a group membership. In this case, the information that has not been revealed up until this point remains hidden and the anonymity of the device, up to the group membership, is still preserved.

In the session establishment step, a session is created with two ephemeral keypairs generated by devices A and B. The session keys are used to apply authenticated encryption to the anonymous credentials that are exchanged. The devices use a zero-knowledge proof to show the possession of credentials issued by a certain certification authority. Also, both devices include separate proof-commitments for each of their attributes. The proof-commitments are helper data used later to prove that the revealed attributes are those for which possession was previously proven. As used herein, helper data pertains to the separate commitments of every attribute of the device. A commitment is a cryptographic primitive that allows an entity to commit to a chosen value (or chosen statement) while keeping the value or statement hidden from other devices, and while retaining the ability to reveal the committed to value later. Commitment schemes are designed so that a party cannot change the value or statement after they have committed to it: that is, commitment schemes are binding. By first sharing separate proof-commitments associated with each of the attributes, for the gradual revelation of attributes, more efficient credential verification and communication can be conducted.

The gradual attribute revelation step follows the session establishment step. In the gradual attribute revelation step, attributes are exchanged one-by-one and verified after each disclosure. Following each attribute revelation and verification, a decision can be made whether to continue with the protocol. This exchange continues until both devices have revealed all their attributes, or until one of the devices in the communication ends the protocol.

By first proving possession of the anonymous credentials using a zero-knowledge proof and including the separate proof-commitments associated with each attribute before gradually disclosing the attributes, the described protocol runs more efficiently than doing a full proof for each attribute revelation.

In accordance with an embodiment, there is provided, a method for authenticating one device to another device, the method including: proving, by a first device to a second device, that a first credential comprising multiple first attributes is valid; proving, by the second device to the first device, that a second credential comprising multiple second attributes is valid; revealing, by the first device to the second device, a first attribute of the multiple first attributes; verifying, by the second device, the first attribute of the multiple first attributes; deciding, by the second device, to continue revealing attributes; revealing, by the second device to the first device, a first attribute of the multiple second attributes; verifying, by the first device, the first attribute of the multiple second attributes; deciding, by the first device, to continue revealing attributes; and repeating the steps of revealing, verifying, and deciding until one of the first or second devices end the method or until no attributes of the multiple first and second attributes remain to be revealed. Proving, by the first device to the second device, that the first credential comprising multiple first attributes is valid, may further include: proving possession, by the first device, of the multiple first attributes of the first device without revealing any of the multiple first attributes using a zero-knowledge proof; adding helper data to the proof of possession that serves as a proof-commitment for each of the multiple first attributes; and verifying, by the second device, the proof of possession of the multiple first attributes. Proving, by the second device to the first device, that a second credential comprising multiple second attributes is valid, may further include: proving possession, by the second device, of the multiple second attributes of the second device without revealing any of the multiple second attributes using a zero-knowledge proof; adding helper data to the proof of possession that serves as a proof-commitment for each of the multiple second attributes; and verifying, by the first device, the proof of possession of the multiple second attributes. Verifying, by the second device, the first attribute of the multiple first attributes, may further include using helper data to verify the first revealed attribute of the multiple first attributes. The first and second devices may be characterized as being ultra-wideband devices. One of the multiple first attributes may be stored in a secure element of the first device. The authentication may be fully anonymous for both the first and second devices until the revealing of the first attributes of the multiple first and second attributes. The method may further include communicating by the first and second devices the first attributes in encrypted form. The multiple first attributes may serve as a hierarchical identity of the first device. The multiple second attributes may serve as a hierarchical identity of the second device.

In another embodiment, there is provided, a method for authenticating one device to another device over an ephemeral channel bound to the authentication, the method including: proving possession, by the first device, of a plurality of first certified attributes of the first device without revealing any of the plurality of first certified attributes using a zero-knowledge proof; adding helper data to the proof of possession that separately serves as a proof-commitment for each of the plurality of first certified attributes; verifying, by the second device, the proof of possession of the plurality of first certified attributes; proving possession, by the second device, of a plurality of second certified attributes of the second device without revealing any of the plurality of second certified attributes using the zero-knowledge proof; adding helper data to the proof of possession that separately serves as a proof-commitment for each of the plurality of second certified attributes; verifying, by the first device, the proof of possession of the plurality of second certified attributes; revealing, by the first device to the second device, a first attribute of the plurality of first certified attributes; using, by the second device, first helper data to verify the first revealed attribute of the plurality of first certified attributes; deciding, by the second device, whether to continue revealing attributes; if the second device decides to continue, the second device revealing a first attribute of the plurality of second certified attributes to the first device; using, by the first device, second helper data to verify the first revealed attribute of the plurality of second certified attributes; deciding by the first device whether to continue revealing attributes; and if the first device decides to continue revealing attributes, repeating the steps of revealing, committing, and deciding until no attributes of the pluralities of first and second certified attributes remain to be revealed. The first and second devices may be characterized as being ultra-wideband devices. One of the plurality of first certified attributes may be stored in a secure element of the first device. The authentication may be fully anonymous for both the first and second devices until the revealing of the first attributes of the pluralities of first and second certified attributes. The steps of revealing by the first and second devices may further include sending the first attributes in encrypted form. The plurality of first certified attributes may serve as a hierarchical identity of the first device. The plurality of second certified attributes may serve as a hierarchical identity of the second device.

FIG. 1 illustrates a flowchart of method 20 for authenticating a communication between two devices in accordance with an embodiment. The method begins at step 22. Steps 22 and 24 are used to establish a session between a first device and a second device. At step 22, a first device proves to a second device that a first credential comprising multiple first attributes is valid. At step 24, the second device proves to the first device that a second credential comprising multiple second attributes is valid. In one embodiment, steps 22 and 24 are performed without revealing any of the attributes using a zero-knowledge proof. Also, helper data is added which serves as proof-commitments for each of the attributes. In addition, the second device verifies that the proof of possession of the multiple first attributes of the first device is valid, and the first device verifies that the proof of possession of the multiple second attributes of the second device is valid. Steps 26 to 40 are attribute revelation portion of the method. At step 26, the first device reveals a first attribute of the multiple of first attributes to the second device. At step 28, the second device commits to the first attribute using helper data to verify the first attribute. As used herein, helper data pertains to the separate commitments in the credential. A device may have multiple credentials with attributes. The method involves only attributes of a credential of interest. A commitment is a cryptographic primitive that allows one to commit to a chosen value (or chosen statement) while keeping the value or statement hidden from others, while retaining the ability to reveal the committed value later. Commitment schemes are designed so that a party cannot change the value or statement after they have committed to it: that is, the commitment schemes are binding. After verifying the first attributed at step 26, the method moves to decision step 30. At decision step 30, the second device decides whether to continue with the protocol. The second device can decide based on any reason. If the second device decides not to continue revealing attributes, the NO path is taken to step 32 and method 20 ends. If the second device decides to continue revealing attributes, the YES path is taken to step 34. At step 34, the second device reveals to the first device a first attribute of the multiple second attributes. At step 36, the first device commits to the first attribute using helper data to verify the first attribute from the second device in the same way as described at step 28. If the first device decides to stop revealing attributes, the NO path is taken to step 40 and method 20 ends. If the first device decides to continue revealing attributes, the YES path is taken to step 42. At step 42, steps 26 through 42 are repeated until all the attributes are revealed, or one of the first or second devices decides to end method 20.

Figure 2:
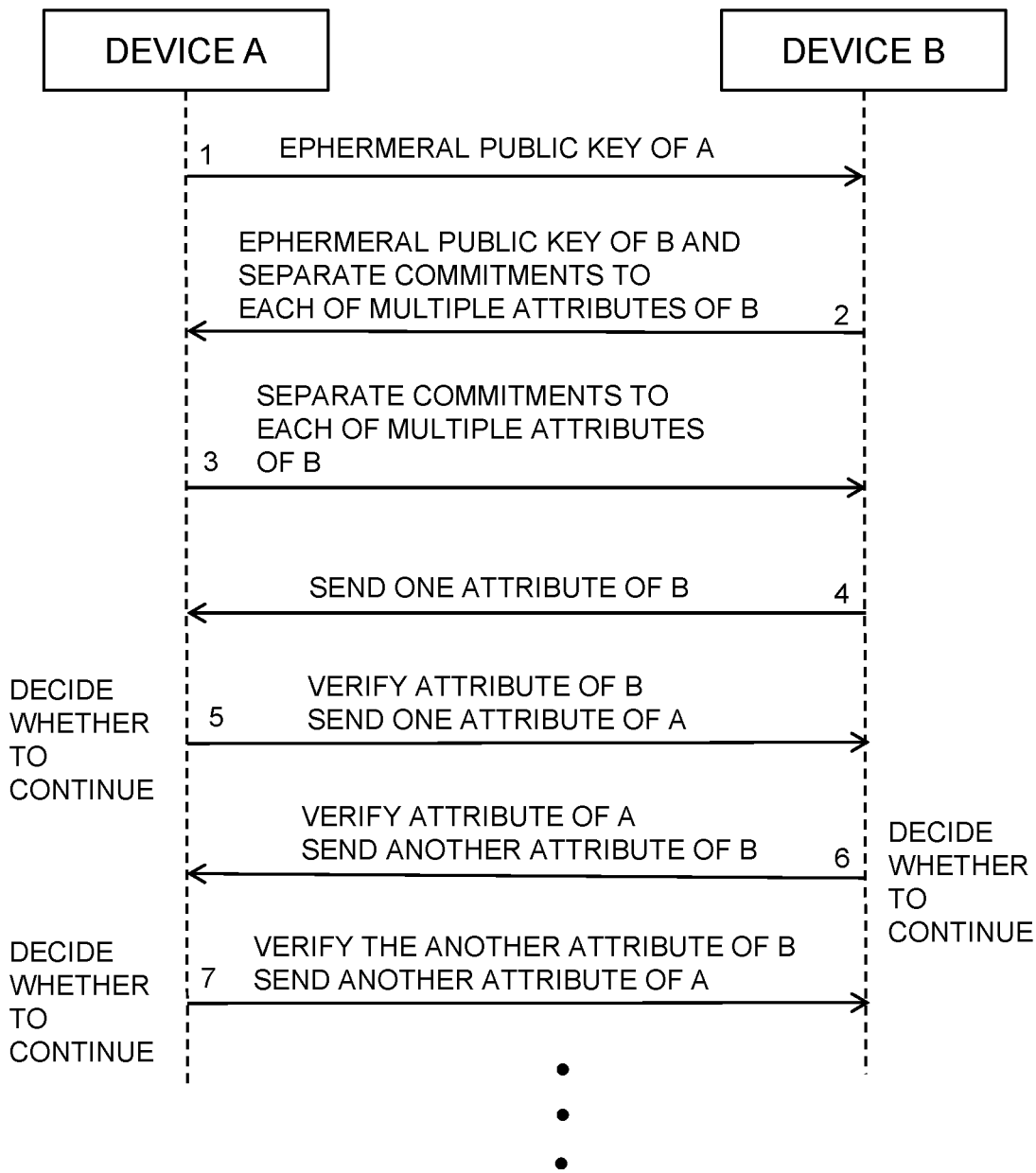
FIG. 2 illustrates a session between two devices in accordance with the authentication method.

FIG. 2 illustrates a session between a device A and a device B in accordance with the authentication method. The session may be for a communication or some other type of transaction. In the session, arrows between the device A and device B indicate the message transmission. Device A and device B both generate an ephemeral key pair. At transmission 1, device A begins the session by transmitting its ephemeral public key to device B. Device B derives a session key and proof of knowledge. At transmission 2, device B transmits its ephemeral public key and the proof of knowledge to device A. In addition, device B transmits separate proof-commitments for each of multiple attributes of device B under the derived session key. Device A derives the session key and proof of knowledge. Also, at transmission 3, device A transmits separate proof-commitments for each of multiple attributes of device A under the derived session key. At transmission 4, device B sends one attribute of its multiple attributes to device A. At transmission 5, device A verifies the attribute of device B and decides whether to continue with the protocol. As illustrated in FIG. 2, device A decides to continue with the protocol and sends one of its attributes to device B (step 5). At transmission 6, device B verifies the attribute of device A and decides whether to continue with the protocol. Then, if device B decides to continue, another attribute of B is sent to device A. As illustrated at transmission 7, device A again verifies the attribute of device B and the steps of the session can continue until all the attributes of both devices have been revealed or the decision is made to end the method by one of the devices.

The only attribute that needs to be handled by a secure element (SE) is the attribute corresponding to the secret key of the device. Therefore, any randomization of the secret key and commitment to the secret key needs to be generated within the SE. However, all of the other computations can be handled outside of the SE. Also, all computations corresponding to the commitment phase of the proof of knowledge can be precomputed. Note that the protocol can be instantiated in other ways. For instance, instead of operating in an RSA (Rivest, Shamir, and Adelman) encryption group, pairings or elliptic curve cryptography can be used to implement multiple-show anonymous credentials. A blind signature scheme can be used to sign commitments. One could also use multiple single show credentials instead of a single multi-show credential. Both include multiple attributes, but multi-show credentials can be used multiple times while remaining unlinkable. Single-show credentials can be linked. In the case of single-show credentials a new credential needs to be acquired before engaging in a new protocol run to guarantee unlinkability of the interactions involving the attributes.

A set of t-values are used by devices A(B) to commit to random choices for a zero knowledge proof. The t-values $t_A$ and $t_B$ are for an ephemeral Diffie-Hellman run. Variable $c_A(c_B)$ represents the challenge used in the proof by A(B). The variable $S_A(S_B)$ denotes all the s-values that A(B) creates for the proof. Finally, $P_A(x)(P_B(x))$ denotes the entire transcript of the proof where x was part of the input material for the challenge. After each verification operation the verifying party decides whether a continuation of the protocol is desired.

The protocol describes an authentication between devices A and B. Device A generates $r_A \in Z_q$, $t_A = g^{r_A}$ and in a first message, transmits $t_A$ to device B. Device B generates $r_B \in Z_q$, $t_B = g^{r_B}$ and derives $K = KDF(t_B^{r_A})$ where KDF represents key derivation function. Device B transmits $t_B$ and an authenticated encryption $\{P_B(t_A, t_B)\}_K$ under key K to device A in a second message. Device computes $K = KDF(t^{r_A}_B)$ and verifies $P_B$. In a third message, device A transmits authenticated encryption $\{P_A(t_B, t_A)\}_K$ under key K to device B. Device B verifies $P_A$. In a fourth message device B reveals an authenticated encrypted attribute $\{a_{A1}\}_K$ to device A. Device A verifies attribute $a_{A1}$.

Note, that in the above protocol, only a MAC would be needed instead of authenticated encryption in the first and second messages as all values are either ephemeral or randomized. However, in the described embodiment, an authenticated encryption is used everywhere to keep the needed number of APIs and symmetric keys low.

In the above protocol, in a first step, an ephemeral channel is authenticated by means of a zero-knowledge proof showing the possession of credentials issued by a certain certification authority. In a second step, the attributes are revealed one-by-one in an efficient way. The attributed are revealed such that the revealed attributes cannot be linked to each. There are essentially two ways to achieve this, either the credential is refreshed by the issuer every time it is used or a multiple-show credential is used. In the latter case, a signature on the credentials is randomized by the user before each showing (i.e. protocol run). It will now be described how to instantiate the different elements in the protocol specifically.

The goal of the proof is to prove the possession of attributes $m_i$ without revealing the attributes and to show that a valid signature was obtained and is known on the attributes. The only requirement to the signature scheme is that it can be blinded several times by the owner without interaction with the issuer. At this point it is assumed that a multiple-show anonymous credential (A, e, v) has already been obtained and can be verified by verifying the following equation:

$$Z = \pm A^e W^v \Pi R_i^{m_i} \pmod{n}$$

where n is a public RSA modulus and Z, W, $R_i$ are public parameters in $QR_n$.

The proof is only provided in detail for device A, the proof can be applied to device B by switching all occurrences of A to B in indices of variables and vice versa. The attributes $m_i$ are not indexed by A or B for legibility. All other portions which do not carry an index A or B and are not chosen randomly are identical for both devices.

Initially all r-values and t-values need to be derived. Note that this step can be precomputed. In particular $$r_A \in_R \{0,1\}^{l_n} \text{ and the derived } t_A = g^{r_A} \text{ and}$$

$$r_W \in_R \{0,1\}^{l_n + l_0}$$

to randomize the signature by deriving $A' = AW^{r_W} \pmod n$ and $v' = v - er_W$ (this step provides the unlinkability) and $$\tilde{e} \in_R \pm\{0,1\}^{l_e + l_0 + l_H}$$

$$\tilde{v} \in_R \pm\{0,1\}^{l_v + l_0 + l_H}$$

$$\tilde{m}_i \in_R \pm\{0,1\}^{l_m + l_0 + l_H}$$

Finally compute $\tilde{Z} = (A')^{\tilde{e}} W^{\tilde{v}} \Pi R_i^{\tilde{m}_i} \pmod n$ and store the proof-commitments $t_i = R_i^{\tilde{m}_i}$ for later inclusion in the proof.

The challenge is the part where both devices need to contribute, otherwise a replay attack is possible. This also implies that from this point on, no pre-computation should be used. Device B can compute the challenge right after receiving the t-values from device A. Device A should wait until the first response is received from device B. The challenge is composed as follows:

$$c_A = H(t_A, t_B, \tilde{Z}, \{t_i\}_{i=1\ldots n}, A')$$

The s-values are the last part to complete the proof. In particular, the following values should be calculated:

$$\hat{e} = \tilde{e} + c_A e' \text{ with } e' = e - 2^{l_e - 1};$$

$$\hat{v} = \tilde{v} + c_A v';$$

$$\hat{m}_i = \tilde{m}_i + c_A m_i; \text{ and}$$

the set of all s-values is denoted as S.

Putting all this together the proof $P_A(t_A, t_B)$ consists of $$\{t_A, t_B, A', c_A, S, \{t_i\}_{i=1\ldots n}\}$$

Note that the values $\{t_i\}_{i=1\ldots n}$ are not needed for the verification of the proof but are needed during revelation of the attributes $m_i$. Also note that attribute $m_0$ is not revealed in the described embodiment as this constitutes the private key of the user.

$$\bar{Z} = \left(\frac{Z}{(A')^{2^{l_e-1}}}\right)^{-c_A} (A')^{\hat{e}} W^{\hat{v}'} \prod R_i^{\hat{m}_i} \pmod{n}$$

Verify that $$c_A \stackrel{?}{=} H(t_A, t_B, \bar{Z}, \{t_i\}_{i=1\ldots n}, A')$$

After receiving $m_i$ the attribute is verified as follows:

$$t_i \stackrel{?}{=} R_i^{\hat{m}_i - c_A m_i} \pmod{n}$$

By first proving possession of the anonymous credentials using a zero-knowledge proof and including the separate proof-commitments for each attribute before gradually disclosing the attributes, the described protocol runs more efficiently than doing a full proof for each attribute revelation.

Figure 3:
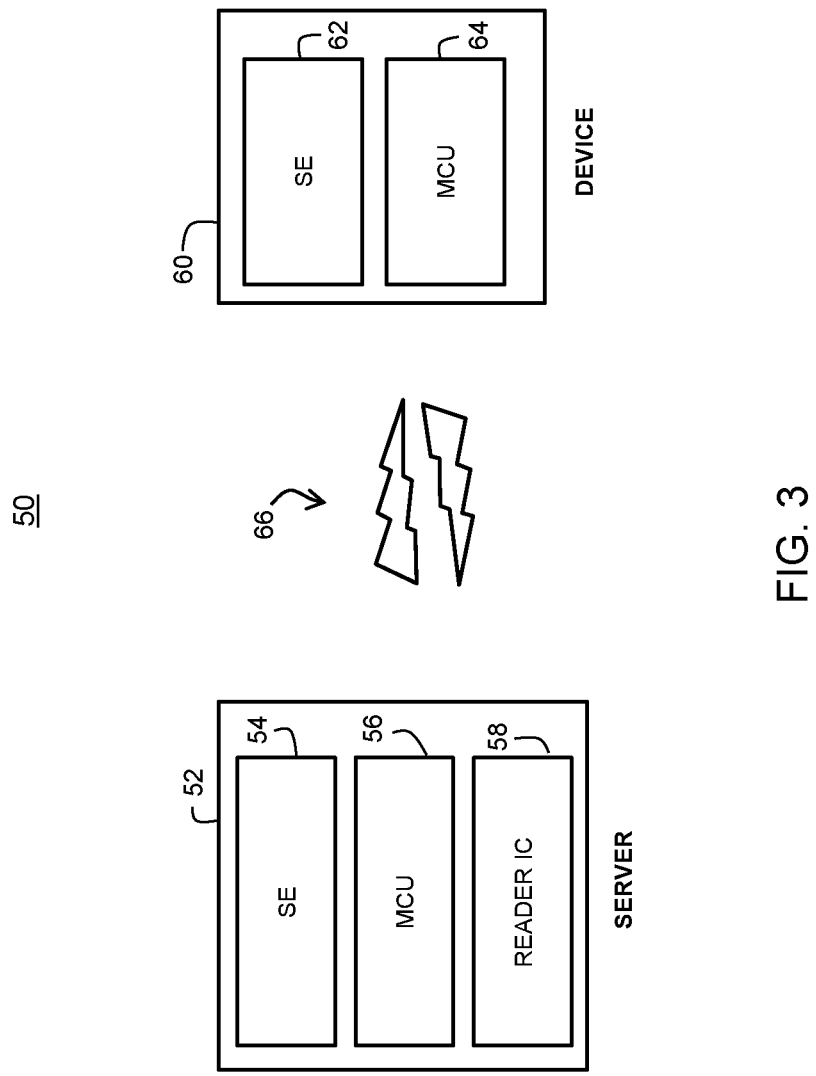
FIG. 3 illustrates a system having a server and a device for use with the method of authenticating as provided in FIG. 1 and FIG. 2.

FIG. 3 illustrates a system 50 having a server and a device for use with the method of authenticating as provided in FIG. 1 and FIG. 2. Server 52 and device 60 communicate with each other using a wireless mechanism such as ultra-wideband (UWB). Server 52 includes secure element 54, MCU (microcontroller unit) 56, and reader IC 58. The secure element may be used for authentication and verification as discussed above. Secure element 54 may include a secure memory for storing security related data such as an authentication key, and a processor for running security applications and for providing the protection to the secure memory. Microcontroller unit 56 may run the sessions for server 52 and perform the computations. Reader IC 58 allows server 52 to communication bidirectionally and wirelessly 66 with device 60 using a conventional wireless protocol such as WIFI, UWB, or Bluetooth. Device 60 may be a tag or may be another device, such as a smartphone having an application to emulate a tag. Device 60 includes secure element 62 and MCU 64. Secure element 62 may be similar to secure element 54 and include a secure memory and a processor. Microcontroller unit 64 may be similar to MCU 56 and process the session computations for device 60. Even though only one server and one device are shown in FIG. 3, there may be multiple servers and multiple devices in the same vicinity and within wireless range of each other. Communications according to the description can occur between a server and a device as shown, or communications can be between two servers or between two devices.

Various embodiments, or portions of the embodiments, may be implemented in hardware or as instructions on a non-transitory machine-readable storage medium including any mechanism for storing information in a form readable by a machine, such as a personal computer, laptop computer, file server, smartphone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for authenticating one device to another device, the method comprising:
   proving, by a first device to a second device, that a first credential comprising multiple first attributes is valid;
   proving, by the second device to the first device, that a second credential comprising multiple second attributes is valid;
   revealing, by the first device to the second device, a first attribute of the multiple first attributes;
   verifying, by the second device, the first attribute of the multiple first attributes;
   deciding, by the second device, to continue revealing attributes;
   revealing, by the second device to the first device, a first attribute of the multiple second attributes;
   verifying, by the first device, the first attribute of the multiple second attributes;
   deciding, by the first device, to continue revealing attributes; and
   repeating the steps of revealing, verifying, and deciding until one of the first or second devices end the method or until no attributes of the multiple first and second attributes remain to be revealed.

2. The method of claim 1, wherein proving, by the first device to the second device, that the first credential comprising multiple first attributes is valid, further comprises:
   proving possession, by the first device, of the multiple first attributes of the first device without revealing any of the multiple first attributes using a zero-knowledge proof;
   adding helper data to the proof of possession that serves as a proof-commitment for each of the multiple first attributes; and
   verifying, by the second device, the proof of possession of the multiple first attributes.

3. The method of claim 1, wherein proving, by the second device to the first device, that a second credential comprising multiple second attributes is valid, further comprises:
   proving possession, by the second device, of the multiple second attributes of the second device without revealing any of the multiple second attributes using a zero-knowledge proof;

adding helper data to the proof of possession that serves as a proof-commitment for each of the multiple second attributes; and verifying, by the first device, the proof of possession of the multiple second attributes.

4. The method of claim 1, wherein verifying, by the second device, the first attribute of the multiple first attributes, further comprises using helper data to verify the first revealed attribute of the multiple first attributes.

5. The method of claim 1, wherein the first and second devices are characterized as being ultra-wideband devices.

6. The method of claim 1, wherein one of the multiple first attributes is stored in a secure element of the first device.

7. The method of claim 1, wherein the authentication is fully anonymous for both the first and second devices until the revealing of the first attributes of the multiple first and second attributes.

8. The method of claim 1, further comprising communicating by the first and second devices the first attributes in encrypted form.

9. The method of claim 1, wherein the multiple first attributes serve as a hierarchical identity of the first device.

10. The method of claim 1, wherein the multiple second attributes serve as a hierarchical identity of the second device.

11. A method for authenticating one device to another device over an ephemeral channel bound to the authentication, the method comprising:

proving possession, by the first device, of a plurality of first certified attributes of the first device without revealing any of the plurality of first certified attributes using a zero-knowledge proof;

adding helper data to the proof of possession that separately serves as a proof-commitment for each of the plurality of first certified attributes;

verifying, by the second device, the proof of possession of the plurality of first certified attributes;

proving possession, by the second device, of a plurality of second certified attributes of the second device without revealing any of the plurality of second certified attributes using the zero-knowledge proof;

adding helper data to the proof of possession that separately serves as a proof-commitment for each of the plurality of second certified attributes;

verifying, by the first device, the proof of possession of the plurality of second certified attributes;

revealing, by the first device to the second device, a first attribute of the plurality of first certified attributes;

using, by the second device, first helper data to verify the first revealed attribute of the plurality of first certified attributes;

deciding, by the second device, whether to continue revealing attributes;

if the second device decides to continue, the second device revealing a first attribute of the plurality of second certified attributes to the first device;

using, by the first device, second helper data to verify the first revealed attribute of the plurality of second certified attributes;

deciding by the first device whether to continue revealing attributes; and if the first device decides to continue revealing attributes, repeating the steps of revealing, committing, and deciding until no attributes of the pluralities of first and second certified attributes remain to be revealed.

12. The method of claim 11, wherein the first and second devices are characterized as being ultra-wideband devices.

13. The method of claim 11, wherein one of the plurality of first certified attributes is stored in a secure element of the first device.

14. The method of claim 11, wherein the authentication is fully anonymous for both the first and second devices until the revealing of the first attributes of the pluralities of first and second certified attributes.

15. The method of claim 11, wherein the steps of revealing by the first and second devices further comprises sending the first attributes in encrypted form.

16. The method of claim 11, wherein the plurality of first certified attributes serves as a hierarchical identity of the first device.

17. The method of claim 11, wherein the plurality of second certified attributes serve as a hierarchical identity of the second device.

* * * * *